US009575656B2

(12) United States Patent
Huang et al.

(10) Patent No.: US 9,575,656 B2
(45) Date of Patent: Feb. 21, 2017

(54) METHOD, ELECTRONIC DEVICE, AND COMPUTER PROGRAM PRODUCT FOR DISPLAYING VIRTUAL BUTTON

(71) Applicant: Wistron Corporation, New Taipei (TW)

(72) Inventors: Ya-Shian Huang, New Taipei (TW); Ting-Yao Cheng, New Taipei (TW); Yi-Chi Li, New Taipei (TW); Chen-Pu Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 52 days.

(21) Appl. No.: 14/600,015

(22) Filed: Jan. 20, 2015

(65) Prior Publication Data

US 2016/0103606 A1 Apr. 14, 2016

(30) Foreign Application Priority Data

Oct. 9, 2014 (TW) .............................. 103135230 A

(51) Int. Cl.
*G06F 3/0488* (2013.01)
*G06F 3/0482* (2013.01)
*G06F 3/0486* (2013.01)

(52) U.S. Cl.
CPC ......... *G06F 3/04886* (2013.01); *G06F 3/0482* (2013.01); *G06F 3/0486* (2013.01)

(58) Field of Classification Search
CPC ........................... G06F 3/041–3/04897; G06F 2203/04101–2203/04113

(Continued)

(56) References Cited

U.S. PATENT DOCUMENTS 5,966,122 A * 10/1999 Itoh ..................... G06F 3/04845
348/239
2011/0252375 A1* 10/2011 Chaudhri ............ G06F 3/04817
715/835

(Continued)

FOREIGN PATENT DOCUMENTS

TW 201312448 3/2013

OTHER PUBLICATIONS

"Office Action of Taiwan Counterpart Application", issued on Aug. 7, 2015, with English translation thereof, p. 1-p. 15, in which the listed foreign reference was cited.

*Primary Examiner* — Stephen Sherman
(74) *Attorney, Agent, or Firm* — Jianq Chyun IP Office

(57) ABSTRACT

A method, an electronic device, and a computer program product for displaying a virtual button are provided in the invention. The method includes the following steps. First, the virtual button is activated. Each interactive object displayed on a display frame of a touch screen is detected to obtain an object region occupied by each of the interactive objects, and an initial position of the virtual button on the display frame is obtained. Next, whether the initial position of the virtual button is located within the object region determined. If yes, the virtual button would be displayed at the initial position. If no, whether a non-object region satisfies a first predetermined condition is determined so as to accordingly display the virtual button at the initial position, a first designated position lies within the non-object region, or a second designated position lies within both of the object region and the non-object region.

17 Claims, 8 Drawing Sheets

(58) Field of Classification Search
 USPC ......... 345/173–178; 178/18.01–18.09, 18.11
 See application file for complete search history.

(56) References Cited

U.S. PATENT DOCUMENTS

| | | |
|---|---|---|
| 2013/0019182 A1 | 1/2013 | Gil et al. |
| 2014/0165006 A1* | 6/2014 | Chaudhri ............ G06F 3/04817 715/835 |
| 2014/0282208 A1* | 9/2014 | Chaudhri ............ G06F 3/04883 715/779 |

\* cited by examiner

METHOD, ELECTRONIC DEVICE, AND COMPUTER PROGRAM PRODUCT FOR DISPLAYING VIRTUAL BUTTON

CROSS-REFERENCE TO RELATED APPLICATION

This application claims the priority benefit of Taiwan application serial no. 103135230, filed on Oct. 9, 2014. The entirety of the above-mentioned patent application is hereby incorporated by reference herein and made a part of this specification.

BACKGROUND OF THE INVENTION

1. Field of the Invention

The invention generally relates to a displaying method, an electronic device and a computer program product thereof, in particular, to a method, an electronic device, and a computer program product for displaying a virtual button.

2. Description of Related Art

To accommodate people's busy lifestyles, mobile electronic devices such as personal digital assistants, smart phones, and tabular computers have become indispensable. As an example, a smart phone equipped with a touch screen may not only include each feature provided by a traditional communication device, but may also include a built-in operation system that carries out versatile tasks such as document editing, e-mail serving, web serving, multimedia playing, photo shooting, and instant communication, and thus its usage has surpassed all the other electronic devices.

Such electronic device may commonly employ physical buttons such as a home button, a volume button, a power button, and so forth. Although such electronic device may be subjected to a fatigue durability testing on its appearance and mechanical design, the physical buttons may be overstretched due to high usage such that the actual use of the physical buttons may not satisfy their expected lifetime. For instance, the home button configured to exit out of applications to the home screen becomes a most frequently used and easily damaged button.

An assistive virtual button displayed on a touch screen has been therefore created to substitute most features offered by physical buttons so as to reduce the wear and tear thereon. However, the existing techniques may only display the virtual button on restricted areas such as the edges of the touch screen. The displayed position of the virtual button may not be freely changed based upon user preferences or different scenarios. In particular, the displayed position of such conventional virtual button may be normally fixed. Since different software applications may result different displayed frames or user interfaces, the virtual button may entirely or partially overlap with interactive objects such as function buttons (e.g., a confirm button) or a function list of the different displayed frames or user interfaces. The user may need to first move the virtual button elsewhere, otherwise he/she may not be able to select a desired interactive object to be operated on or may accidentally touch the virtual button.

SUMMARY OF THE INVENTION

Accordingly, the invention is directed to a method, an electronic device, and a computer program product for displaying a virtual button, where a position for displaying the virtual button may be set under the premise that the user is able to smoothly operate each interactive object so as to optimize user experience.

The invention is directed to a method for displaying a virtual button, adapted to an electronic device having a touch screen. The method includes the following steps. First, the virtual button is activated. Next, at least one interactive object displayed on a display frame of the touch screen is detected so as to obtain an object region occupied by the at least one interactive object, and an initial position of the virtual button on the display frame is obtained. Whether the initial position of the virtual button is located within the object region is determined. When the initial position of the virtual button is not located within the object region, the virtual button is displayed at the initial position on the display frame. When the initial position of the virtual button is located within the object region, whether a non-object region satisfies a first predetermined condition is determined so as to accordingly display the virtual button at the initial position, a first designated position located within the non-object region, or a second designated position concurrently located within the object region and the non-object region on the display frame, where the non-object region is a region outside of the object region on the display frame.

According to an embodiment of the invention, before the initial position of the virtual button on the display frame is obtained, the virtual button is further displayed on the display frame, and a dragging operation performed on the virtual button is detected, and a terminated point of the dragging operation is set as the initial position.

According to an embodiment of the invention, the first predetermined condition includes that there exists at least one first allowable position in the non-object region, where when the virtual button is displayed at any of the at least one first allowable position, the virtual button does not overlap with the object region.

According to an embodiment of the invention, when the initial position of the virtual button is located within the object region and the non-object region is determined to satisfy the first predetermined condition, the first designated position is set as a position among the at least one first allowable position with a shortest distance from the initial position, and the virtual button is displayed at the first designated position.

According to an embodiment of the invention, when the initial position of the virtual button is located within the object region and the non-object region is determined not to satisfy the first predetermined condition, whether at least one second allowable position different from the at least one allowable position exists is determined, where each of the at least one second allowable position is concurrently located within the object region and the non-object region as well as satisfies a second predetermined condition. When the at least one second allowable position exists, the second designated position is set as a position among the at least one second allowable position with a shortest distance from the initial position, and the virtual button is displayed at the second designated position. When the at least one second allowable position does not exist, the virtual button is displayed at the initial position in a semi-transparent manner.

According to an embodiment of the invention, the second predetermined condition includes that the virtual button does not overlap with a center point of the interactive object at each of the at least one second allowable position, and a center point of the virtual button does not with the interactive object at each of the at least one second allowable position.

According to an embodiment of the invention, the second predetermined condition includes that an overlapping region between the virtual button and the interactive object at each of the second allowable position is less than a predetermined proportion of a total area of the interactive object.

According to an embodiment of the invention, the virtual button is displayed on a top-most layer of the display frame.

The invention is also directed to an electronic device having a touch screen, a storage unit, and at least one processing unit, where the at least one processing unit is coupled to the touch screen and the storage unit. The touch screen is configured to display a display frame. The storage unit is configured to record a plurality of modules. The at least one processing unit is configured to access and execute the modules stored in the storage unit. The modules include an activating module, a positioning module, a determination module, and a displaying module. The activating module is configured to activate a virtual button. The positioning module is configured to detect each at least one interactive object displayed on the display frame so as to obtain an object region occupied by the at least one interactive object and is also configured to obtain an initial position of the virtual button on the display frame. The determination module is configured to determine whether the initial position of the virtual button is located within the object region. When the initial position of the virtual button is not located within the object region, the displaying module is configured to display the virtual button at the initial position on the display frame. When the initial position of the virtual button is located within the object region, the displaying module is configured to determine whether a non-object region satisfies a first predetermined condition so as to accordingly display the virtual button at the initial position, a first designated position located within the non-object region, or a second designated position concurrently located within both of the object region and the non-object region, where the non-object region is a region outside of the object region on the display frame.

The invention is also directed to a computer readable medium, recording programs to be loaded into an electronic device to perform steps of: activating the virtual button; detecting each at least one interactive object displayed on a display frame of the touch screen so as to obtain an object region occupied by the at least one interactive object; obtaining an initial position of the virtual button on the display frame; determining whether the initial position of the virtual button is located within the object region; when the initial position of the virtual button is not located within the object region, displaying the virtual button at the initial position on the display frame; and when the initial position of the virtual button is located within the object region, determining whether a non-object region satisfies a first predetermined condition so as to accordingly display the virtual button at the initial position, a first designated position located within the non-object region, or a second designated position concurrently located within the object region and the non-object region on the display frame, where the non-object region is a region outside of the object region on the display frame.

In summary, the method, electronic device, and computer program product for displaying a virtual button provided in the invention may first identify at least one displayed interactive object. Under the premise that the user is able to smoothly operate the interactive objects, a position for displaying the virtual button may be set according to the region outside of the interactive objects. Based on user preferences or user habits, the virtual button may also be displayed at an optimized position which is also expected by the user. As the wear and tear on physical buttons reduces, the invention also allows for the flexibility to display the virtual button to optimize user experience.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
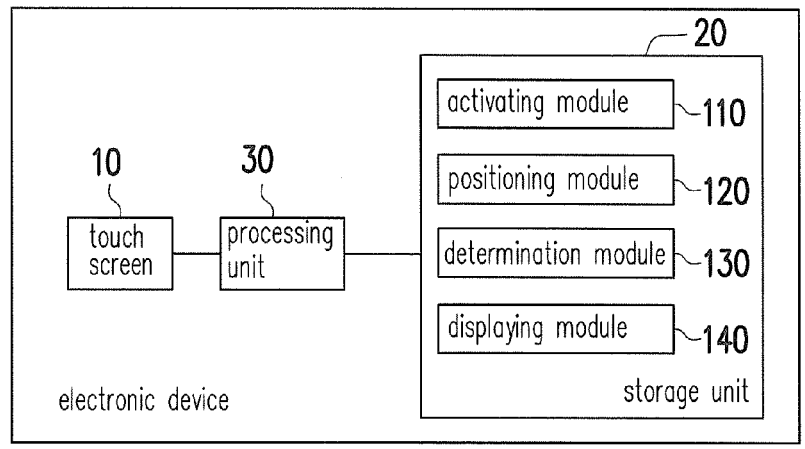
FIG. 1 illustrates a block diagram of an electronic device in accordance with an embodiment of the invention.

Besides displaying a virtual button on a top-most layer of a display frame, the main idea of the invention is to freely display the virtual button based on user preferences, user habits, or system settings, and to avoid displaying the virtual button on top of interactive objects such as folders, application icons, function icons of applications, and so forth. This allows the flexibility to display the virtual button under the premise that the user is able to smoothly operate the interactive objects.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

FIG. 1 illustrates a block diagram of an electronic device in accordance with an embodiment of the invention. It should, however, be noted that this is merely an illustrative example and the invention is not limited in this regard. All components of the electronic device and their configurations are first introduced in FIG. 1. The detailed functionalities of the components are disclosed along with FIG. 2.

Referring to FIG. 1, an electronic device 100 includes a touch screen 10, a storage unit, and at least one processing unit 30. In the present embodiment, the electronic device 100 may be a smart phone, a tabular computer, a personal digital assistant, an e-book, a digital camera, and so forth. The invention is not limited herein.

The touch screen 10 may be a display integrated with touch detection components, which may provide a display feature as well as an input feature. Such display may be a liquid crystal display (LCD), a light-emitting diode (LED) display, a field emission display (FED) or other types of displays. The invention is not limited herein. The touch detection components are arranged in rows and columns in the display for detecting a touch input by a finger, a palm, or other objects from the touch screen 10. The touch detection components may be, for example, capacitive touch detection components, surface acoustic wave touch detection components, electromagnetic touch detection components, or near-field imaging touch detection components, and yet the invention is not limited thereto.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 30. The modules include an activating module 110, a positioning module 120, a determination module 130, and a displaying module 140, where the modules may be loaded into the processing unit 30 for performing the method for displaying a virtual button proposed by the invention.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of the aforesaid devices. The processing unit 30 is coupled to the touch screen 10 and the storage unit 20, and configured to perform the method for displaying a virtual button.

Figure 2:
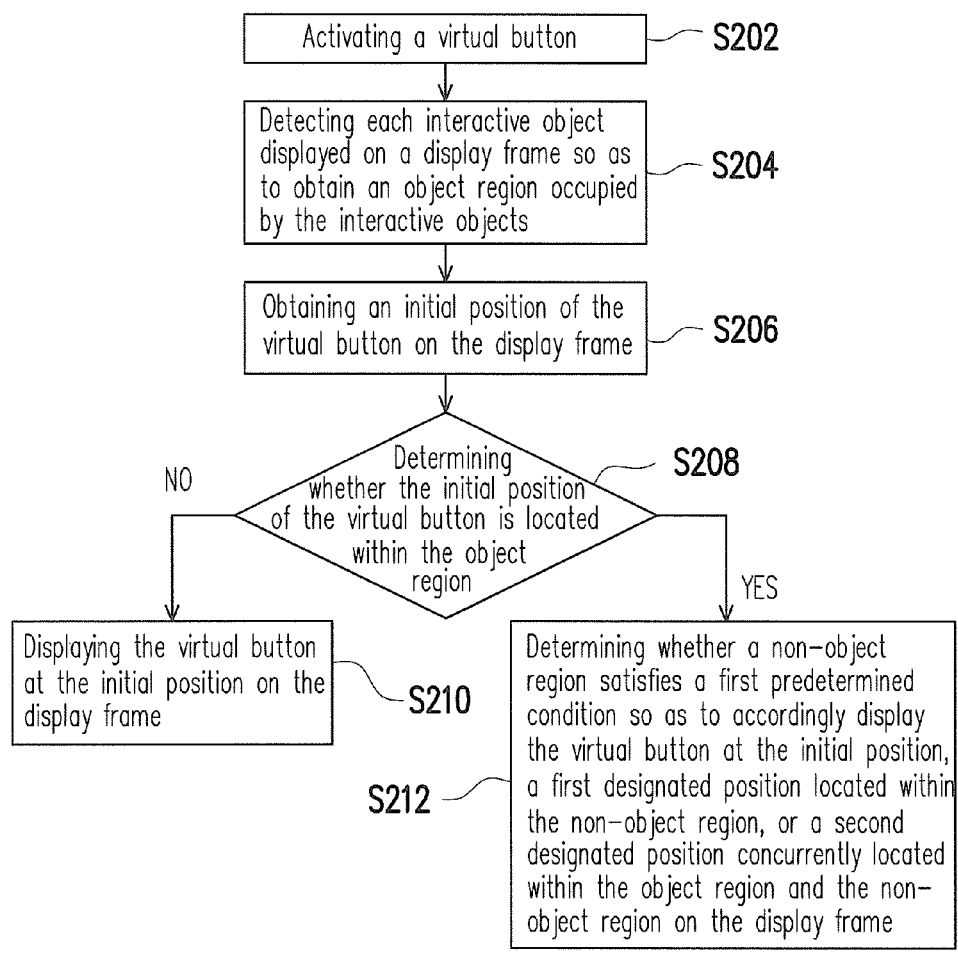
FIG. 2 illustrates a flowchart of a method for displaying a virtual button according to an embodiment of the invention.

FIG. 2 illustrates a flowchart of a method for displaying a virtual button according to an embodiment of the invention. The method in the present embodiment may be implemented by the electronic device 100 in FIG. 1. Detailed steps of the proposed method would be illustrated along with the components of the electronic device 100.

Referring to FIG. 2, the activating module 110 first activates a virtual button (Step S202). The virtual button herein is a soft button programmed to replace physical buttons or other operating structures. In the following description, the virtual button may function as a home button. In some embodiments, the virtual button may function as other physical buttons such as a volume button, a previous page button, and a power button as well as provide features such as screen rotation, lock screen, screen standby, print screen, brightness adjustment, and so forth. The virtual button may also function as a customized shortcut menu. The invention is not limited herein.

In an embodiment, the activating module 110 may activate the virtual button when the user enables the virtual button. For example, after the user enables the virtual button via a shortcut or system setting, the activating module 110 would receive an activating signal to activate the virtual button. In another embodiment, assume that the virtual button has already been enabled. When the electronic device 100 wakes up from a standby mode, the activating module 110 may simultaneously activate the virtual button. In another embodiment, the virtual button may be permanently activated and displayed on the touch screen 10 until the user manually disables it.

Next, the positioning module 120 detects each interactive object displayed on the display frame so as to obtain an object region occupied by the interactive objects (Step S204). As for illustration, the interactive objects exist in plural number in the present embodiment. To be specific, the positioning module 120 may first determine the type of the display frame so as to identify each of the interactive objects displayed on the display frame. For example, when the display frame is a home screen of the electronic device 100, the interactive objects may be application icons. When the display frame is a user interface of an application, the interactive objects may be function buttons of the application. When the display frame is a file management interface, the interactive objects may be folders, files, and function buttons on the file management interface.

After the positioning module 120 identifies each of the interactive objects on the display frame, it may obtain a coordinate of a center of each of the interactive objects or absolute coordinates of four corners of each of the interactive objects with respect to a top-left corner of the display frame (e.g., x- and y-coordinates) and accordingly obtain a region occupied by the interactive objects, where such region is the aforesaid "object region."

Next, the positioning module 120 obtains an initial position of the virtual button on the display frame (Step S206), and the determination module 130 determines whether the initial position of the virtual button is located within the object region (Step S208). The initial position herein may be a position preset by the system or customized by the user, a position at which the virtual button was most recently displayed, or a position at which the virtual button is most frequently displayed through learning the user's usage behavior. The determination module 130 may determine whether the initial position of the virtual button is located within the object region according to the position of each of the interactive objects. In other words, the determination module 130 determines whether the initial position of the virtual button overlaps with any of the interactive objects.

When the initial position of the virtual button is not located within the object region, the displaying module 140 would display the virtual button at the initial position on the display frame of the touch screen 10 (Step S210). That is, when the virtual button does not overlap with any of the interactive objects on the display frame, the displaying module 140 may directly display the virtual button at the initial position. However, in other embodiments, the displaying module 140 does not rule out the possibility of displaying the virtual button at other random positions outside of the object region.

The virtual button may be displayed in different shapes and designs on the display frame. In the present embodiment, the virtual button may be displayed in a circle shape. In some embodiments, the virtual button may also be displayed in other geometric shapes such as a square, a rectangle, an oval, a star, a polygon, and so forth. In some embodiments, the virtual button may also be displayed as a finger, an arrow, or other customized pattern designs. The invention is not limited herein.

On the other hand, when the initial position of the virtual button is located within the object region, the determination module 130 would determine whether a non-object region satisfies a first predetermined condition so as to accordingly display the virtual button at the initial position, a first designated position located within the non-object region, or a second designated position concurrently located within the object region and the non-object region (Step S212). The non-object region herein is the region outside of the object region on the display frame. In other words, when the virtual button overlaps with any of the interactive objects on the display frame, the determination module 130 may further determine whether the size of the non-object region satisfies the first predetermined condition, and the displaying module 140 may designate a position to display the virtual button based on the determined result. More detailed description of Step S212 will be set forth below along with the following embodiments.

Figure 3:
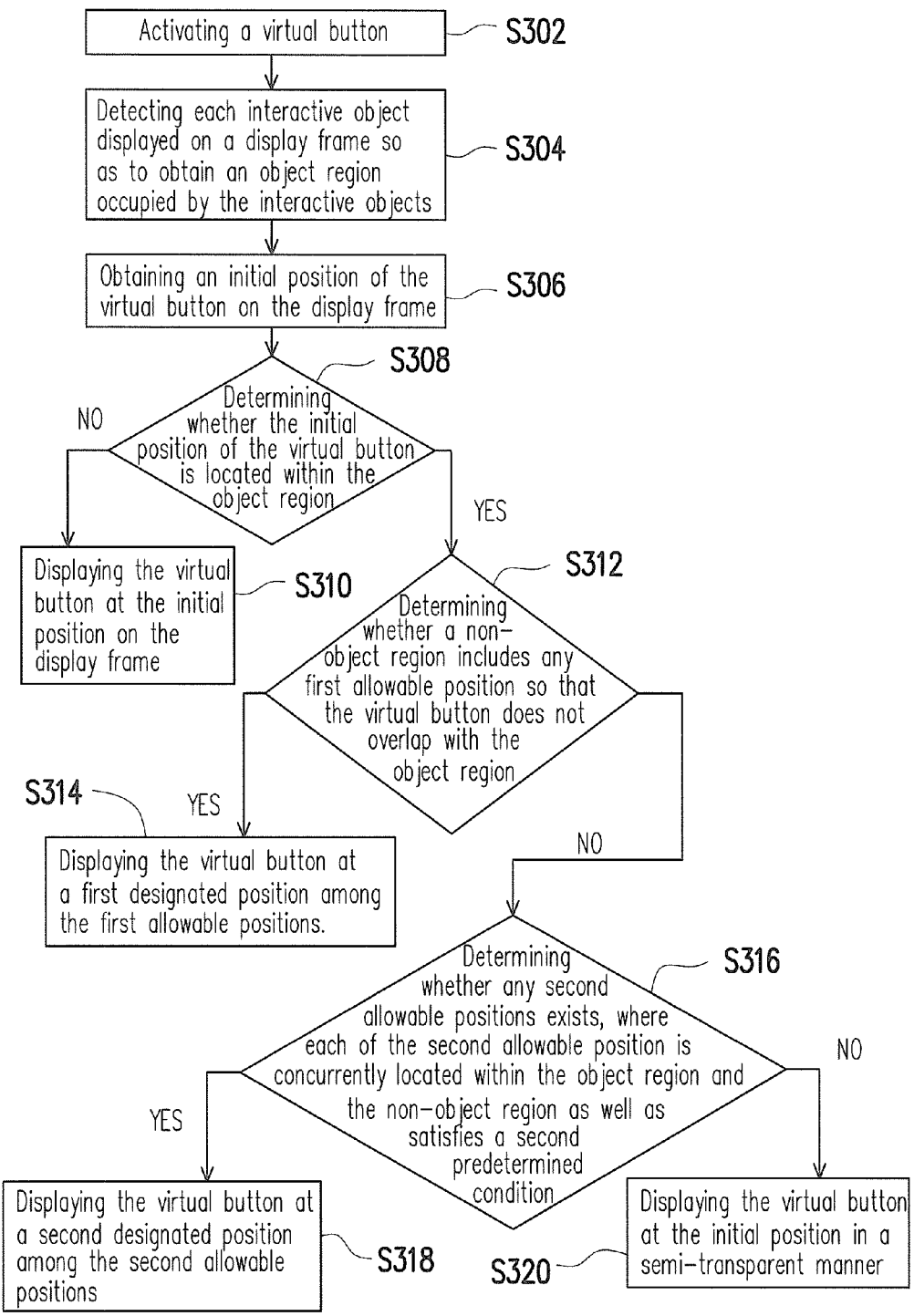
FIG. 3 illustrates a flowchart of a method for displaying a virtual button according to another embodiment of the invention.

FIG. 3 illustrates a flowchart of a method for displaying a virtual button according to another embodiment of the invention. The method in the present embodiment may also be implemented by the electronic device 100 in FIG. 1. Detailed steps of the proposed method would be illustrated along with the components of the electronic device 100.

Referring to FIG. 3, the activating module 110 first activates a virtual button (Step S302), and the positioning module 120 detects each interactive object displayed on the display frame so as to obtain an object region occupied by the interactive objects (Step S304) as well as to obtain an initial position of the virtual button on the display frame (Step S306). As for illustration, the interactive objects exist in plural number in the present embodiment. Next, the determination module 130 determines whether the initial position of the virtual button is located within the object region (Step S308). When the initial position of the virtual button is not located within the object region, the displaying module 140 would display the virtual button at the initial position on the display frame of the touch screen 10 (Step S310). Steps S302-S310 herein are identical to Steps S202-Step S210. The repetitive details may be referenced above and will not be hereinafter further described.

When the initial position of the virtual button is located within the object region, the determination module 130 would determine whether a non-object region satisfies a first predetermined condition. The first predetermined condition herein is that the non-object region includes at least one first allowable position, where the first allowable position does not overlap with any of the interactive objects. In other words, when the initial position of the virtual button is located within the object region, the determination module 130 would determine whether the non-object region includes any first allowable position (Step S312) to find out whether there exists sufficient space in the region outside the interactive objects to display the virtual button such that the virtual button does not overlap with any of the interactive objects. As for illustration, the first allowable positions exist in plural number in the present embodiment.

When the determination module 130 determines that the non-object region includes the first allowable positions (i.e., the non-object region satisfies the first predetermined condition), the displaying module 140 would display the virtual button at a position among the first allowable positions with a shortest distance from the initial position (Step S314), where such position may be referred to as a "first designated position." In another embodiment, the displaying module 140 may also display the virtual button at a random position among the first allowable positions. The invention is not limited herein.

Figure 4:
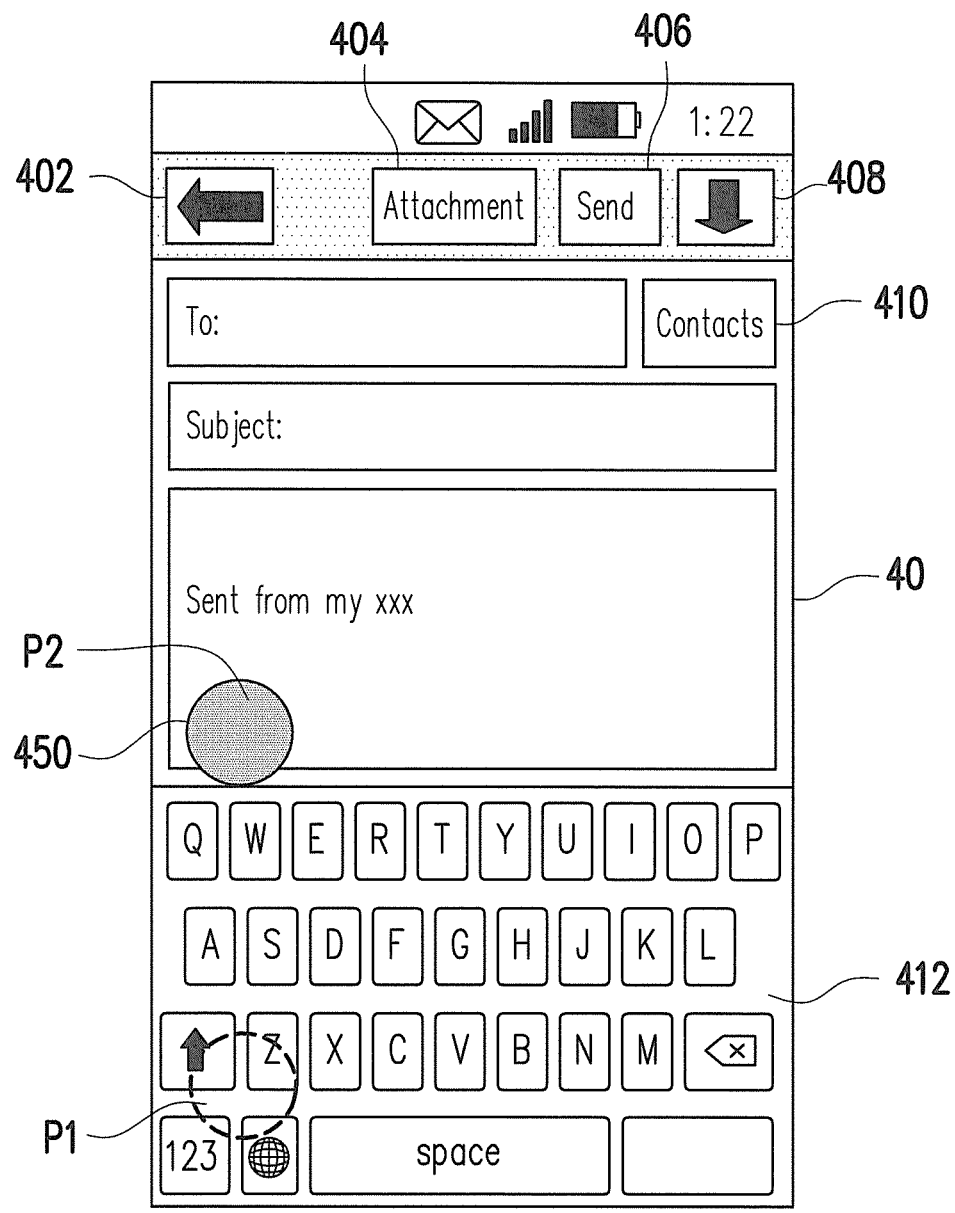
FIG. 4 illustrates an example of displaying a virtual button according to another embodiment of the invention.

As an example, FIG. 4 illustrates an example of displaying a virtual button according to another embodiment of the invention. Referring to FIG. 4, a display frame 40 in this example may be an e-mail composing interface of an e-mail application. The interactive objects may be a "back to previous page" button 402, a "file attachment" button 404, a "mail sending" button 406, a "more options" button 408, a "contact list" button 410, and a virtual keyboard 412 allowing the user for character input. In this example, the determination module 130 of the electronic device 100 may determine that an initial position P1 of the virtual button is located within the object region; that is, the virtual button overlaps with the virtual keyboard 412. Hence, the displaying module 140 may display the virtual button 450 at a position P2 located within the non-object region with a shortest distance from the initial position P1.

Revisiting FIG. 3, when the determination module 130 determines that the non-object region does not include any first allowable position (i.e., the non-object region does not satisfy the first predetermined condition), the determination module 130 would determine whether there exists at least one second allowable position concurrently located within the object region and the non-object region and satisfying a second predetermined condition (Step S316). To be specific, when the determination module 130 is not able to find out any position at which the virtual button does not overlap with any of the interactive objects, the virtual button would be enforced to overlap with at least one of the interactive objects. The determination module 130 may further determine whether the second allowable position exists so as to designate another position which does not affect user operation to display the virtual button.

Figure 5A:
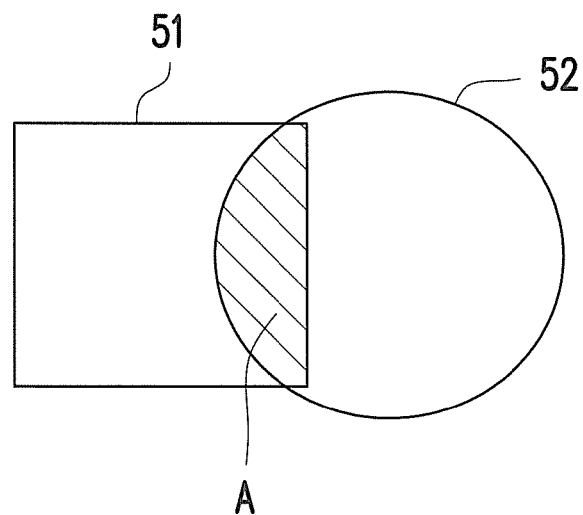
FIG. 5A and FIG. 5B illustrate schematic diagrams of two second predetermined conditions according to an embodiment of the invention.

In an embodiment, the second predetermined condition herein is that an overlapping region between the virtual button and any of the interactive objects is less than a predetermined proportion of a total area thereof. The predetermined proportion herein may be, for example, 40% or a user-defined proportion. In other words, under the second predetermined condition, the overlapping region between the virtual button and the interactive object at the second allowable position is less than the predetermined proportion of the total area of the interactive object. As an example illustrated in FIG. 5A, an overlapping region A between an interactive object 51 and a virtual button 52 is less than 40% of a total area of the interactive object 51. Hence, the position where the virtual button 52 is located is the second allowable position.

Figure 5B:
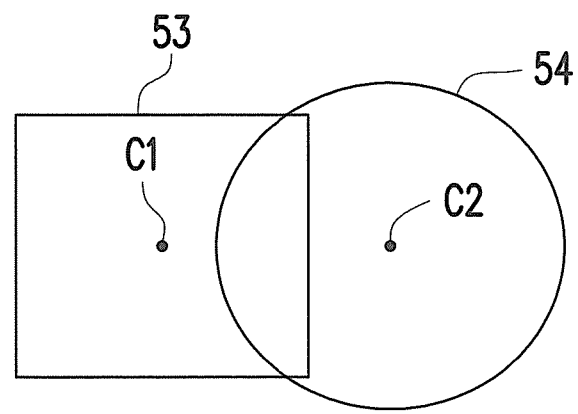

In another embodiment, the second predetermined condition is that each of a center point of the virtual button and a center point of any of the interactive objects are not located within each other's region. In other words, under the second predetermined condition, the virtual button does not overlap with the center point of the interactive object at the second allowable position, and the center point of the virtual button does not overlap with the interactive object at the second allowable position. As an example illustrated in FIG. 5B, each of a center point C1 of an interactive object 53 and a center point C2 of an interactive object 54 is not located within each other's region. Hence, the position where the virtual button 54 is located is the second allowable position.

In another embodiment, the second predetermined condition may be a combination of the two aforesaid embodiments. That is, each of the center of the virtual button and the center of the interactive object at the second allowable position is not within each other's region, and the overlapping region of the virtual button and the interactive object at the second allowable position is less than the predetermined proportion of the total area of the interactive object so that the second allowable position may be strictly defined herein.

Revisiting FIG. 3, when the determination module 130 determines that the second allowable position exists (as for illustration, the second allowable position exists in plural number hereinafter), the displaying module 140 would display the virtual button at a position among the second allowable positions with a shortest distance from the initial position (Step S318), where such position may be referred to as a "second designated position." In an embodiment, when the initial position is already at one of the second allowable positions, the second designated position may be the initial position. In another embodiment, the displaying module 140 may select a position randomly from the second allowable positions to display the virtual button. The invention is not limited herein.

Moreover, the virtual button may be displayed at a topmost layer of the display frame so that the user is able to operate the virtual button smoothly without touching the interactive object overlapping with the virtual button. From another viewpoint, when the user needs to operate the interactive object overlapping with the virtual button, there would exist sufficient space for the user to select the interactive object so as to attain high accuracy and real-time control.

Figure 6:
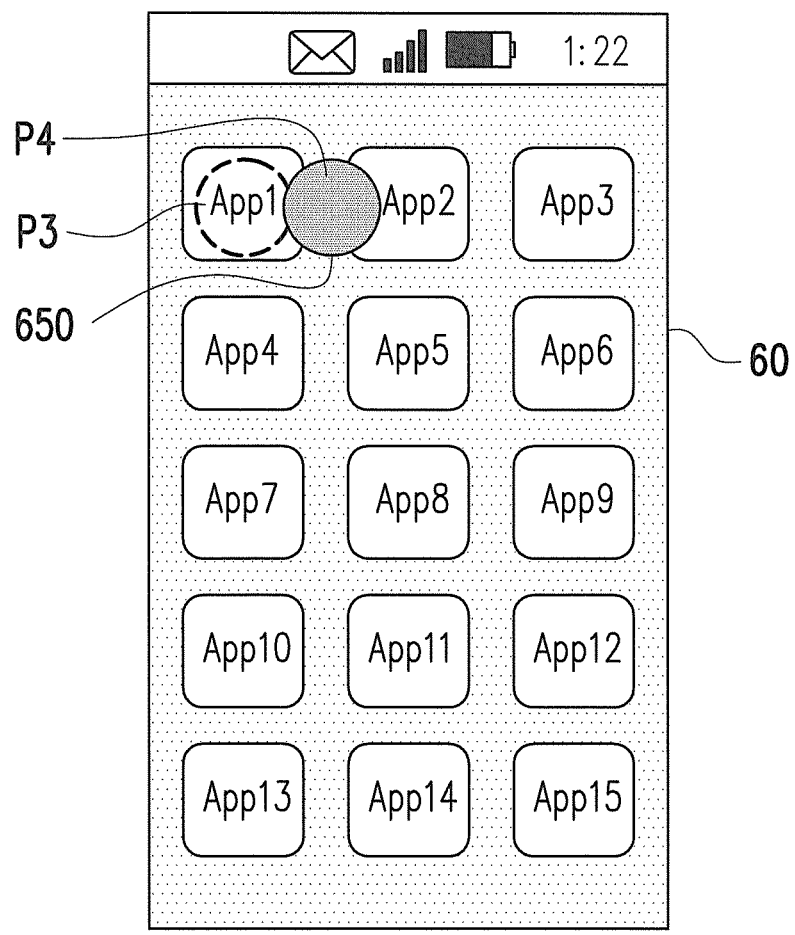
FIG. 6 illustrates an example of displaying a virtual button according to another embodiment of the invention.

For instance, FIG. 6 illustrates an example of displaying a virtual button according to an embodiment of the invention. Referring to FIG. 6, a display frame 60 in this example is a home screen, and interactive objects are application icons App1-App15. The determination module 130 of the electronic device 100 may determine that an initial position P3 of a virtual button 650 is located within an object region; that is, the virtual button 650 overlaps with the application icon App1. Also, there is no sufficient space to display the virtual button 650 without overlapping with any of the application icons. Moreover, when the virtual button 650 is located at the initial position P3, a center thereof would be located within the application icon App1. Hence, in this example, the displaying module 140 may display the virtual button 650 at a position P4, where the position P4 is a position with the shortest distance from the initial position P3 such that at which the center of the virtual button 650 would not be located within the application icon App1. Accordingly, the virtual button 650 may be displayed at the position P4 to minimize an area of the application icon App1 being covered.

Revisiting FIG. 3, when the determination module 130 determines that the second allowable position does not exist, the displaying module 140 would display the virtual button at the initial position in a semi-transparent manner (Step S319). In other words, when the displayed interactive objects are too many such that no suitable space may be provided for displaying the virtual button, the virtual button may be displayed at the initial position in a semi-transparent manner. In other embodiments, the user may set a transparency level of the virtual button to be displayed. The invention is not limited herein.

In another embodiment, assume that the activating module 100 has already activated the virtual button, and the virtual button has been displayed at an initial position of the display frame. While the user is dragging the virtual button from the initial position to a specific position, the positioning module 120 of the electronic device 100 may concurrently detect the dragging operation performed on the virtual button by using the touch screen 10. Moreover, while the user is dragging the virtual button, the displaying module 140 may concurrently display the virtual button. When the positioning module 120 detects that the dragging operation terminates at another specific position and leaves the touch screen 10, the terminated position may be set as the initial position of the virtual button. Next, the electronic device 100 may perform Steps S206-S212 or Steps S306-S320 so as to determine whether to set the current initial position or another allowable position as an ultimate position to display the virtual button.

Figure 7A:
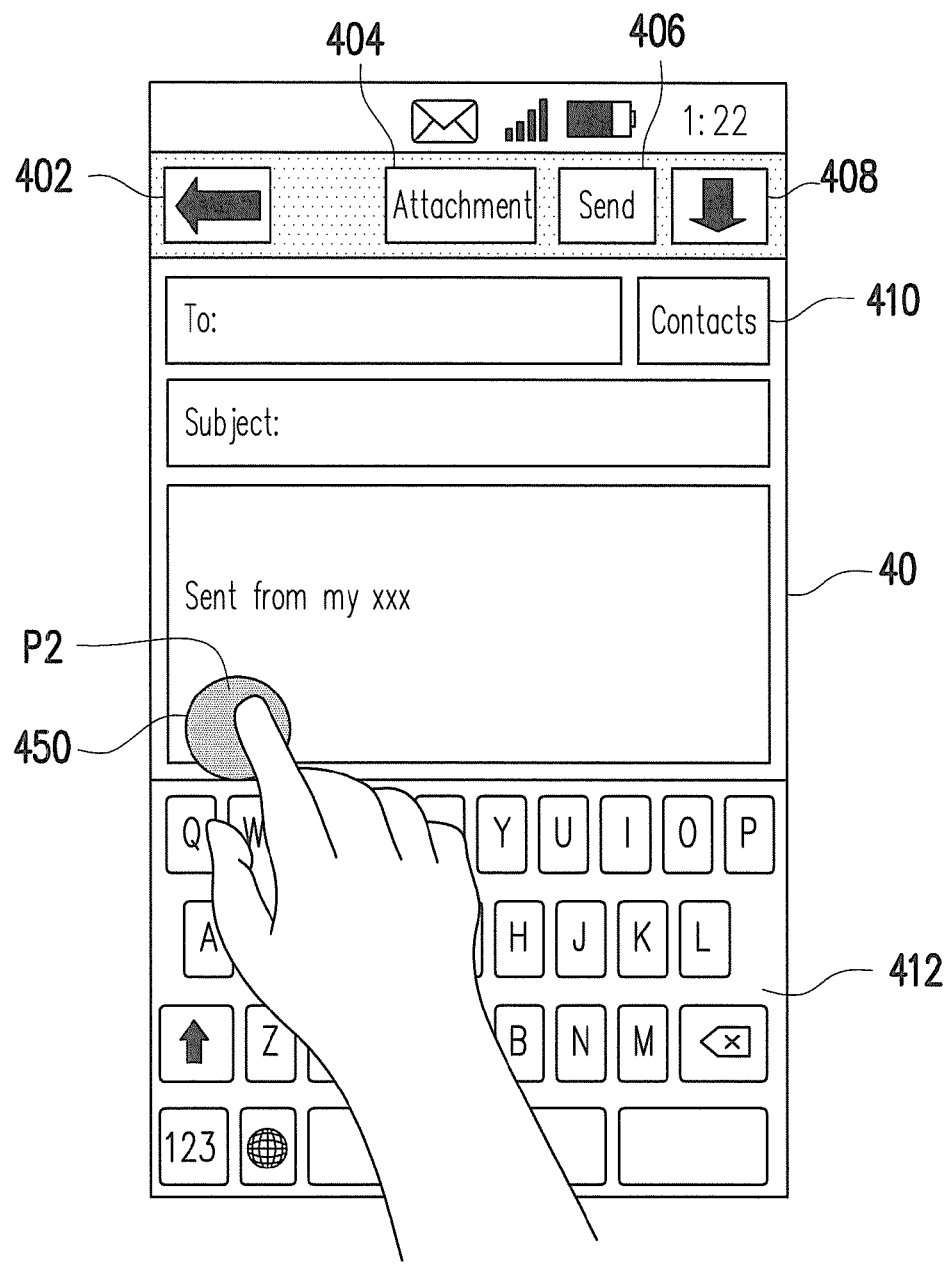
FIGS. 7A-7C illustrate an example of displaying a virtual button according to another embodiment of the invention.
Figure 7B:
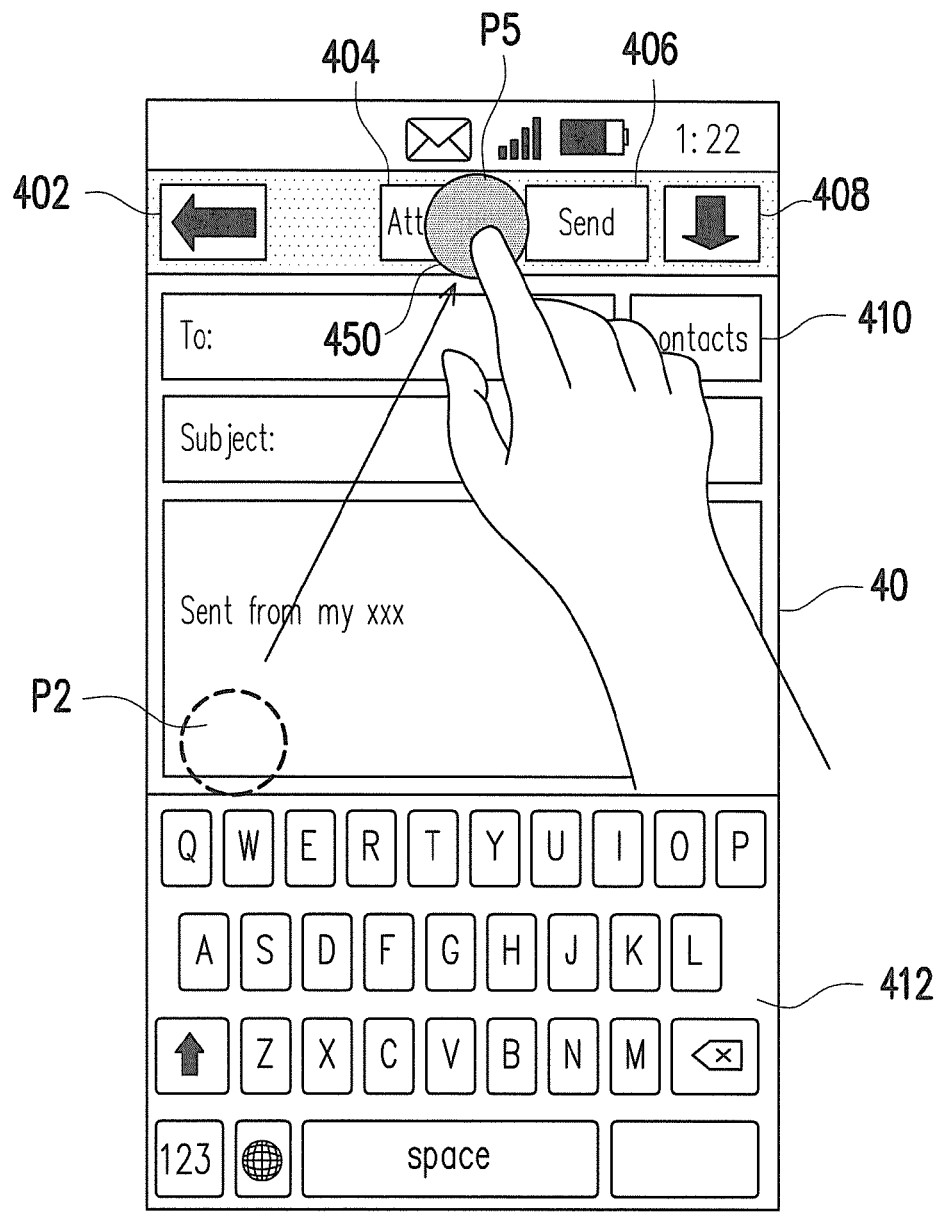
Figure 7C:
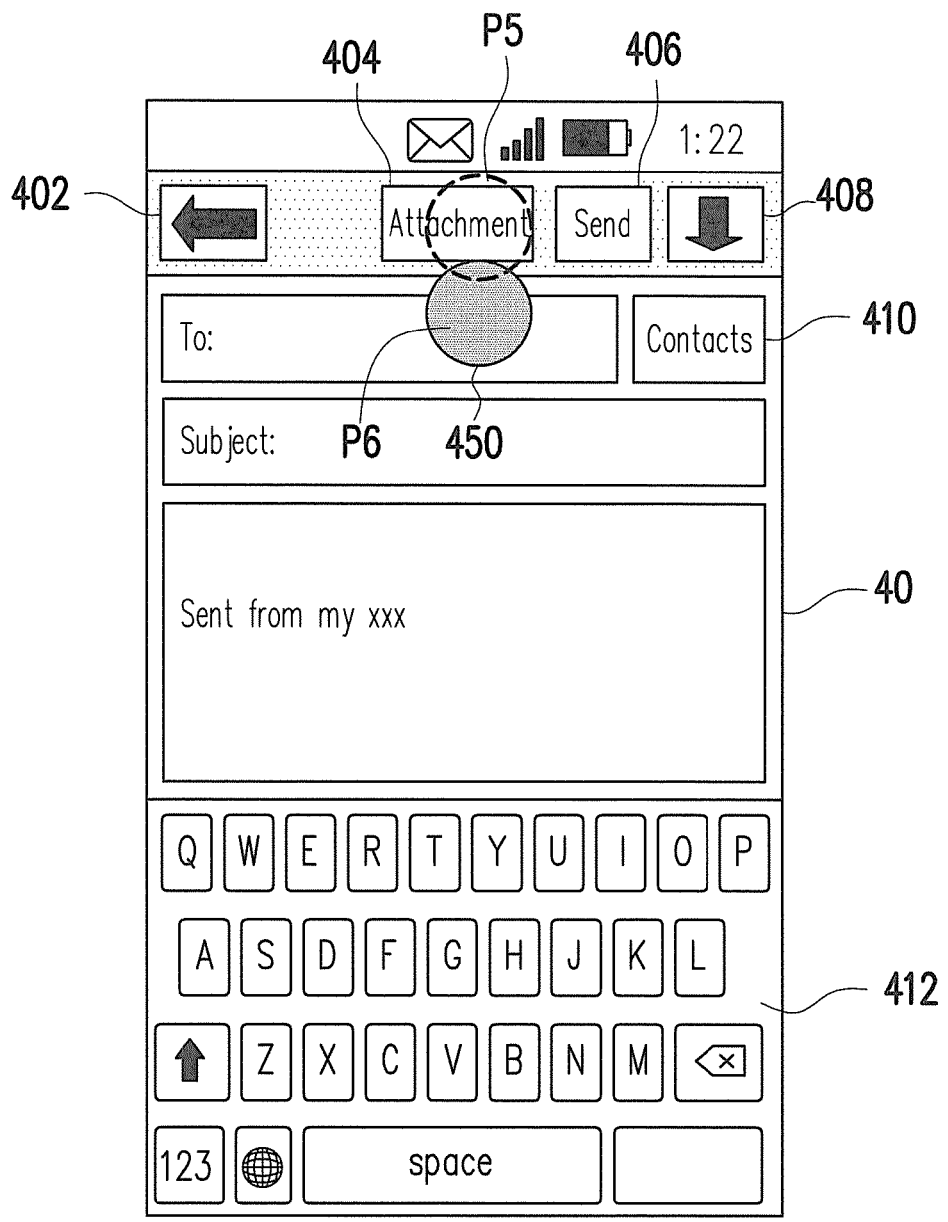

For instance, FIGS. 7A-7C illustrate an example of displaying a virtual button according to an embodiment of the invention. Referring to FIG. 7A, the display frame 40 herein is the same as that in FIG. 4; that is, the virtual button 450 has already been displayed at the position P2. Next, referring to FIG. 7B, the user may drag the virtual button 450 from the position P2 to a position P5; that is, the position P5 is an initial position of the virtual button 450 at this point. However, a center of the position P5 overlaps with the file attachment button 404. In this example, in terms of the region outside of the interactive objects 402-412, there is no sufficient space to display the virtual button 450 without overlapping with any of the interactive objects 402-412. Hence, as illustrated in FIG. 7C, the displaying module 140 may display the virtual button at a position P6 located within the non-object region with a shortest distance from the position P5. Thus, the virtual button 450 may be displayed at an optimized position which is also expected by the user.

After the displaying module 140 displays the virtual button, the user may perform operation on the electronic device 100 through the virtual button. For example, when the user clicks on the virtual button, the electronic device 100 may perform a function provided by the virtual button or may display a function menu for the user to choose from. Moreover, when the user wishes to turn off the virtual button, he/she may disable the virtual button via the shortcut or system setting as well. The activating module 140 may deactivate the virtual button so that the displaying module 140 would no longer display the virtual button on the display frame.

In an embodiment, before the activating module 140 deactivates the virtual button, the positioning module 120 would store the position of the virtual button in a history record as a future reference for setting an initial position of the virtual button to be displayed.

The invention further provides a computer-readable medium, which records a computer program to be loaded into an electronic device to execute various steps of the aforementioned method for displaying a virtual button. The computer program is composed of a plurality of program instructions (for example, organization chart establishing program instructions, table approving program instructions, setting program instructions, and deployment program instructions). Steps of the method for displaying a virtual button may be implemented when these program instructions are loaded into the electronic device and executed by the same.

In summary, the method, electronic device, and computer program product for displaying a virtual button provided in the invention may first identify at least one displayed interactive object. Under the premise that the user is able to smoothly operate the interactive objects, a position for displaying the virtual button may be set according to the region outside of the interactive objects. Based on user preferences or user habits, the virtual button may also be displayed at an optimized position which is also expected by the user. As the wear and tear on physical buttons reduces, the invention also allows for the flexibility to display the virtual button to optimize user experience.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for displaying a virtual button, adapted to an electronic device having a touch screen, wherein the method comprises:

activating the virtual button, wherein the virtual button corresponds to at least one function to control the electronic device;

detecting each at least one interactive object displayed on a display frame of the touch screen so as to obtain an object region occupied by the at least one interactive object;

obtaining an initial position of the virtual button on the display frame;

determining whether the initial position of the virtual button is located within the object region;

when the initial position of the virtual button is not located within the object region, displaying the virtual button at the initial position on the display frame; and when the initial position of the virtual button is located within the object region, determining whether a non-object region satisfies a first predetermined condition, wherein the non-object region is a region outside of the object region on the display frame, wherein the first predetermined condition comprises the non-object region having at least one first allowable position, and wherein when the virtual button is displayed at any of the at least one first allowable position, the virtual button does not overlap with the object region;

if the non-object region satisfies the first predetermined condition, displaying the virtual button at a first designated position located within the non-object region; and if the non-object region does not satisfy the first predetermined condition, displaying the virtual button at a second designated position concurrently located within the object region and the non-object region on the display frame.

2. The method according to claim 1, wherein the step of activating the virtual button comprises:

receiving an activating signal to activate the virtual button.

3. The method according to claim 1, wherein before the step of obtaining the initial position of the virtual button on the display frame, the method further comprises:

displaying the virtual button on the display frame;

detecting a dragging operation performed on the virtual button; and setting a terminated point of the dragging operation as the initial position.

4. The method according to claim 1, wherein when the initial position of the virtual button is located within the object region and the non-object region is determined to satisfy the first predetermined condition:

setting the first designated position as a position among the at least one first allowable position with a shortest distance from the initial position; and displaying the virtual button at the first designated position.

5. The method according to claim 1, wherein when the initial position of the virtual button is located within the object region and the non-object region is determined not to satisfy the first predetermined condition, the method further comprises:

determining whether at least one second allowable position different from the at least one first allowable position exists, wherein each of the at least one second allowable position is concurrently located within the object region and the non-object region as well as satisfies a second predetermined condition;

when the at least one second allowable position exists, setting the second designated position as a position among the at least one second allowable position with a shortest distance from the initial position and displaying the virtual button at the second designated position; and when the at least one second allowable position does not exist, displaying the virtual button at the initial position in a semi-transparent manner.

6. The method according to claim 5, wherein the second predetermined condition comprises:

the virtual button not overlapping with a center point of any of the at least one interactive object at each of the at least one second allowable position, and a center point of the virtual button not overlapping with any of the at least one interactive object at each of the at least one second allowable position.

7. The method according to claim 5, wherein the second predetermined condition comprises:

an overlapping region between the virtual button and any of the at least one interactive object at each of the second allowable position being less than a predetermined proportion of a total area of the any of the at least one interactive object.

8. The method according to claim 1, wherein the virtual button is displayed on a top-most layer of the display frame.

9. An electronic device comprising:

a touch screen, displaying a display frame;

a storage unit, recording a plurality of modules; and one or more processing units, coupled to the touch screen and the storage unit to access and execute the modules stored in the storage unit, wherein the modules comprise:

an activating module, activating a virtual button, wherein the virtual button corresponds to at least one function to control the electronic device;

a positioning module, detecting each at least one interactive object displayed on the display frame so as to obtain an object region occupied by the at least one interactive object and obtaining an initial position of the virtual button on the display frame;

a determination module, determining whether the initial position of the virtual button is located within the object region; and a displaying module, wherein when the initial position of the virtual button is not located within the object region, the displaying module displays the virtual button at the initial position on the display frame, wherein when the initial position of the virtual button is located within the object region, the determination module determines whether a non-object region satisfies a first predetermined condition, wherein if yes, the displaying module displays the virtual button at a first designated position located within the non-object region, wherein if no, the displaying module displays the virtual button at a second designated position concurrently located within both of the object region and the non-object region, wherein the non-object region is a region outside of the object region on the display frame, wherein the first predetermined condition comprises the non-object region having at least one first allowable position, and wherein when the virtual button is displayed at any of the at least one first allowable position, the virtual button does not overlap with the object region.

10. The electronic device according to claim 9, wherein the activating module receives an activating signal to activate the virtual button.

11. The electronic device according to claim 9, wherein before the determination module determines whether the initial position of the virtual button is located within the object region, the displaying module further displays the virtual button on the display frame, and the positioning module detects a dragging operation on the virtual button so as to set a terminated point of the dragging operation as the initial position.

12. The electronic device according to claim 9, wherein when the determination module determines that the initial position of the virtual button is located within the object region and the non-object region satisfies the first predetermined condition, the positioning module sets the first designated position as a position among the at least one first allowable position with a shortest distance from the initial position, and the displaying module displays the virtual button at the first designated position.

13. The electronic device according to claim 9, wherein when the determination module determines that the initial position of the virtual button is located within the object region and the non-object region does not satisfy the first predetermined condition:

the determination module further determines whether at least one second allowable position different from the at least one first allowable position exists, wherein each of the at least one second allowable position is concurrently located within the object region and the non-object region as well as satisfies a second predetermined condition;

when the at least one second allowable position exists, the positioning module sets the second designated position as a position among the at least one second allowable position with a shortest distance from the initial position and the displaying module displays the virtual button at the second designated position; and when the at least one second allowable position does not exist, the displaying module displays the virtual button at the initial position in a semi-transparent manner.

14. The electronic device according to claim 13, wherein the second predetermined condition comprises:

the virtual button not overlapping with a center point of any of the at least one interactive object at each of the at least one second allowable position, and a center point of the virtual button not overlapping with any of the at least one interactive object at each of the at least one second allowable position.

15. The electronic device according to claim 13, wherein the second predetermined condition comprises:

an overlapping region between the virtual button and any of the at least one interactive object at each of the second allowable position less than a predetermined proportion of a total area of the any of the at least one interactive object.

16. The electronic device according to claim 13, wherein the displaying module displays the virtual button on a top-most layer of the display frame.

17. A non-transitory computer readable medium, recording programs to be loaded into an electronic device to perform steps of:

activating a virtual button, wherein the virtual button corresponds to at least one function to control the electronic device;

detecting each at least one interactive object displayed on a display frame of the touch screen so as to obtain an object region occupied by the at least one interactive object;

obtaining an initial position of the virtual button on the display frame;

determining whether the initial position of the virtual button is located within the object region;

when the initial position of the virtual button is not located within the object region, displaying the virtual button at the initial position on the display frame; and when the initial position of the virtual button is located within the object region, determining whether a non-object region satisfies a first predetermined condition, wherein the non-object region is a region outside of the object region on the display frame, wherein the first predetermined condition comprises the non-object region having at least one first allowable position, and wherein when the virtual button is displayed at any of the at least one first allowable position, the virtual button does not overlap with the object region;

if the non-object region satisfies the first predetermined condition, displaying the virtual button at a first designated position located within the non-object region; and if the non-object region does not satisfy the first predetermined condition, displaying the virtual button at a second designated position concurrently located within the object region and the non-object region on the display frame.

* * * * *